(12) United States Patent
Fukuno et al.

(10) Patent No.: US 12,149,066 B2
(45) Date of Patent: Nov. 19, 2024

(54) DC POWER DISTRIBUTION SYSTEM

(71) Applicant: Mitsubishi Electric Corporation, Tokyo (JP)

(72) Inventors: Kenichi Fukuno, Tokyo (JP); Hayato Takeuchi, Tokyo (JP); Takaharu Ishibashi, Tokyo (JP); Takushi Jimichi, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 108 days.

(21) Appl. No.: 17/791,252

(22) PCT Filed: Mar. 9, 2021

(86) PCT No.: PCT/JP2021/009210
§ 371 (c)(1),
(2) Date: Jul. 7, 2022

(87) PCT Pub. No.: WO2021/205801
PCT Pub. Date: Oct. 14, 2021

(65) Prior Publication Data
US 2023/0352930 A1 Nov. 2, 2023

(30) Foreign Application Priority Data
Apr. 8, 2020 (JP) .............................. JP2020-069495

(51) Int. Cl.
H02H 7/22 (2006.01)
H02M 3/335 (2006.01)
(Continued)

(52) U.S. Cl.
CPC .......... *H02H 7/22* (2013.01); *H02M 3/33569* (2013.01); *H02M 7/06* (2013.01); *H02M 7/217* (2013.01)

(58) Field of Classification Search
CPC ... H02H 7/22; H02H 7/28; H02J 1/12; H02M 3/158; H02M 3/33569; H02M 3/33571;
(Continued)

(56) References Cited

U.S. PATENT DOCUMENTS 6,278,200 B1 * 8/2001 Daniel ................. H02J 3/0073
307/31
2012/0200966 A1 8/2012 Hill et al.
(Continued)

FOREIGN PATENT DOCUMENTS

CN 102163932 A * 8/2011
EP 2485354 A1 8/2012
(Continued)

OTHER PUBLICATIONS

Beomseok (Improved Operating Range for Three-Phase Three-Switch Buck-Type Rectifier using Carrier Based PWM, USA, IEEE, 2016, pp. 1-8). (Year: 2016).*
(Continued)

*Primary Examiner* — Scott Bauer
(74) *Attorney, Agent, or Firm* — BUCHANAN, INGERSOLL & ROONEY PC

(57) ABSTRACT

The present disclosure suppresses increase in device cost in a DC power distribution system that can disconnect a distribution line on which a short-circuit failure has occurred, from an output path. This DC power distribution
(Continued)

system includes: a plurality of power conversion devices; one DC busbar; a plurality of distribution lines; a plurality of first current interruption portions respectively connected to input sides of the power conversion devices; a plurality of second current interruption portions connected between the power conversion devices and the DC busbar; and a plurality of third current interruption portions respectively provided on the distribution lines. Interruption current values of the third current interruption portions are set to smaller values than a maximum allowable current value of the power conversion device in which short-circuit current will reach the maximum allowable current value in a shortest time.

8 Claims, 5 Drawing Sheets

(51) Int. Cl.
  *H02M 7/06* (2006.01)
  *H02M 7/217* (2006.01)
(58) Field of Classification Search
  CPC .......... H02M 7/06; H02M 7/28; H02M 7/217; H02M 7/219
  See application file for complete search history.

(56) References Cited

U.S. PATENT DOCUMENTS

| | | |
|---|---|---|
| 2014/0240880 A1 | 8/2014 | Chen et al. |
| 2015/0092311 A1* | 4/2015 | Wang ........................ H02H 3/08 361/86 |
| 2015/0333524 A1* | 11/2015 | Nishikawa ................ H02J 3/32 307/26 |
| 2017/0370993 A1* | 12/2017 | Weinberg ............... G01R 31/40 |
| 2022/0123661 A1* | 4/2022 | Ishibashi ........... H02M 3/33561 |

FOREIGN PATENT DOCUMENTS

| | | | |
|---|---|---|---|
| JP | 2005033895 A | | 2/2005 |
| JP | 2008029044 A | * | 2/2008 |

OTHER PUBLICATIONS

International Search Report (PCT/ISA/210) with translation and Written Opinion (PCT/ISA/237) mailed on May 18, 2021, by the Japan Patent Office as the International Searching Authority for International Application No. PCT/JP2021/009210. (8 pages).

German Office Action dated Feb. 8, 2024, issued in the corresponding German Patent Application No. 112021002212.1, 12 pages including 6 pages of English Translation.

* cited by examiner

DC POWER DISTRIBUTION SYSTEM

TECHNICAL FIELD

The present disclosure relates to a DC power distribution system.

BACKGROUND ART

There is known a DC power distribution system that distributes power supplied from a plurality of power grids, to a plurality of DC loads. The DC power distribution system converts power supplied from AC or DC power grids on the input side, to DC power, using power conversion devices having an AC-DC conversion function or a DC-DC conversion function, and distributes the DC power to distribution lines to which the DC loads are connected. In such a DC power distribution system, when a short-circuit failure has occurred on a distribution line, the distribution line needs to be electrically disconnected from an output path.

In such a conventional DC power distribution system, disconnectors are provided on the distribution lines and current resonance circuits are provided to the power conversion devices. In the DC power distribution system, when a short-circuit failure has occurred on a distribution line, a current zero point is generated by the current resonance circuit of the power conversion device and then the disconnector provided on the distribution line is operated to electrically disconnect the distribution line from the output path (see, for example, Patent Document 1).

CITATION LIST

Patent Document

Patent Document 1: Japanese Laid-Open Patent Publication No. 2008-29044

SUMMARY OF THE INVENTION

Problems to be Solved by the Invention

However, in the conventional DC power distribution system, the current resonance circuit of the power conversion device needs to have a sufficient capacitance that allows conduction of even large short-circuit current caused by the short-circuit failure, resulting in a problem of increasing the size of the current resonance circuit. Size increase of the current resonance circuit leads to increase in device cost for the power conversion device.

The present disclosure has been made to solve the above problem, and an object of the present disclosure is to suppress increase in device cost in a DC power distribution system that can electrically disconnect a distribution line from an output path when a short-circuit failure has occurred on the distribution line.

Solution to the Problems

A DC power distribution system according to the present disclosure includes: a plurality of power conversion devices which convert powers respectively supplied from a plurality of power grids to DC powers and output the DC powers; one DC busbar through which the DC powers outputted from the plurality of power conversion devices flow; a plurality of distribution lines branched from the DC busbar; a plurality of first current interruption portions respectively connected between the plurality of power grids and the plurality of power conversion devices; a plurality of second current interruption portions respectively connected between the plurality of power conversion devices and the DC busbar; and a plurality of third current interruption portions respectively provided on the plurality of distribution lines. Interruption current values of the plurality of third current interruption portions are set to smaller values than a maximum allowable current value of the power conversion device in which short-circuit current will reach the maximum allowable current value of the power conversion device in a shortest time among the plurality of power conversion devices.

Effect of the Invention

In the DC power distribution system according to the present disclosure, the interruption current values of the plurality of third current interruption portions are set to smaller values than the maximum allowable current value of the power conversion device in which short-circuit current will reach the maximum allowable current value of the power conversion device in the shortest time among the plurality of power conversion devices. Thus, when a short-circuit failure has occurred on a distribution line, the distribution line can be electrically disconnected from the output path, and also, increase in device cost can be suppressed.

DESCRIPTION OF EMBODIMENTS

Figure 1:
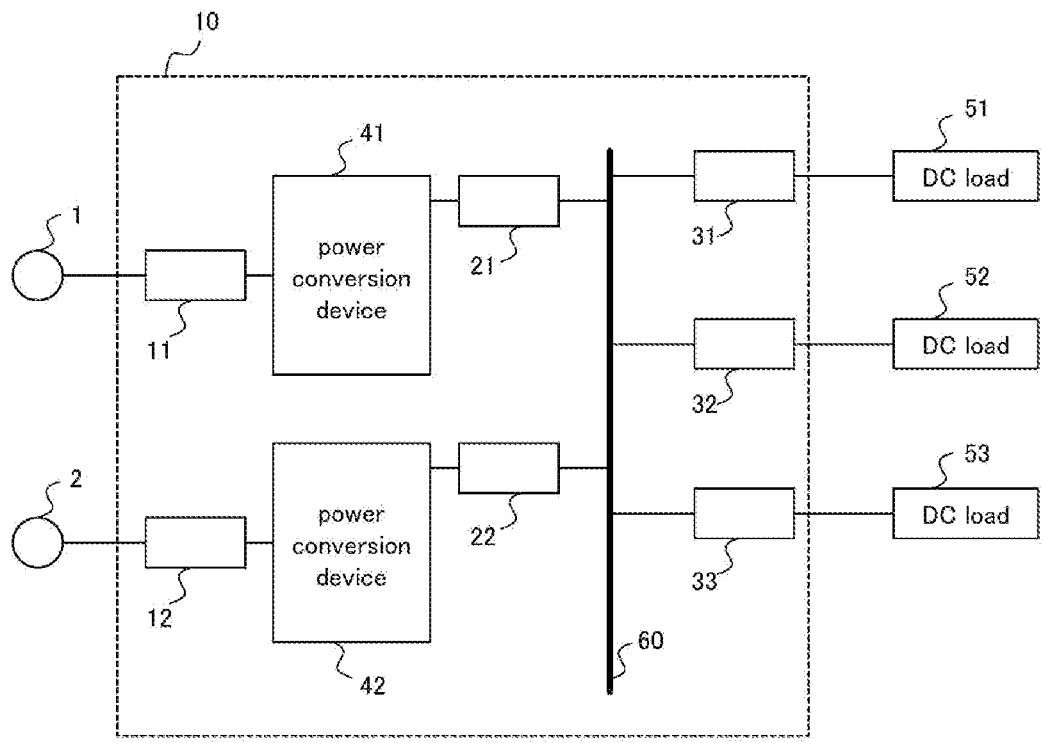
FIG. 1 is a configuration diagram of a DC power distribution system according to embodiment 1.

A DC power distribution system according to embodiments for carrying out the present disclosure will be described in detail with reference to the drawings. In the drawings, the same reference characters denote the same or corresponding parts.

Embodiment 1

FIG. 1 is a configuration diagram of a DC power distribution system according to embodiment 1. In the present embodiment, a DC power distribution system that receives power from two power grids and distributes power to three DC loads will be described as an example. As shown in FIG. 1, a DC power distribution system 10 of the present embodiment receives powers inputted from a plurality of power grids 1, 2 by power conversion devices 41, 42, respectively, and distributes powers to a plurality of DC loads 51, 52, 53. In the DC power distribution system of the present embodiment, there may be three or more power grids and there may be four or more DC loads.

A first current interruption portion 11 is connected to the input side of the power conversion device 41, and a second current interruption portion 21 is connected to the output side of the power conversion device 41. A first current interruption portion 12 is connected to the input side of the power conversion device 42, and a second current interruption portion 22 is connected to the output side of the power conversion device 42. The output of the power conversion device 41 is connected to a DC busbar 60 via the second current interruption portion 21. The output of the power conversion device 42 is connected to the DC busbar 60 via the second current interruption portion 22. DC loads 51, 52, 53 are connected to the DC busbar 60 via third current interruption portions 31, 32, 33, respectively.

The power conversion device 41 receives power from the power grid 1 via the first current interruption portion 11. Then, the power conversion device 41 converts the power received from the power grid 1, to DC power having a different voltage level, and outputs the DC power to the DC busbar 60 via the second current interruption portion 21. The power conversion device 42 receives power from the power grid 2 via the first current interruption portion 12. Then, the power conversion device 42 converts the power received from the power grid 2, to DC power having a different voltage level, and outputs the DC power to the DC busbar 60 via the second current interruption portion 22. The power inputted to the DC busbar 60 is distributed to the DC loads 51, 52, 53 via the third current interruption portions 31, 32, 33.

In the present embodiment, each of the power conversion devices 41, 42 is a DC-DC power conversion device or an AC-DC power conversion device. For example, in a case where the power grid 1 is a DC grid, the power conversion device 41 is a DC-DC power conversion device. In a case where the power grid 2 is an AC grid, the power conversion device 42 is an AC-DC power conversion device. The power conversion devices 41, 42 are power conversion devices composed of semiconductor elements.

In the present embodiment, the first current interruption portions 11, 12, the second current interruption portions 21, 22, and the third current interruption portions 31, 32, 33 may be current circuit breakers such as a semiconductor circuit breaker having a semiconductor element, a no-fuse breaker which interrupts a current path by switching a mechanical contact, or a fuse which interrupts a current path by melting a conductor with Joule heat when large current flows, for example. Appropriate circuit breakers are selected in consideration of the current interruption time required for the DC power distribution system 10, the value of current to be interrupted, cost, and the like.

The DC power distribution system 10 configured as described above receives powers from the plurality of power grids 1, 2, converts the received powers to DC powers by the power conversion devices 41, 42, and then distributes the DC powers to the DC loads 51, 52, 53. Thus, even in a case where one of the power grids 1, 2 falls into power outage, the DC power distribution system 10 can continue distributing power to the DC loads by receiving power from the other power grid.

Next, operation in a case where a short-circuit failure has occurred in the DC power distribution system 10 of the present embodiment will be described.

Figure 2:
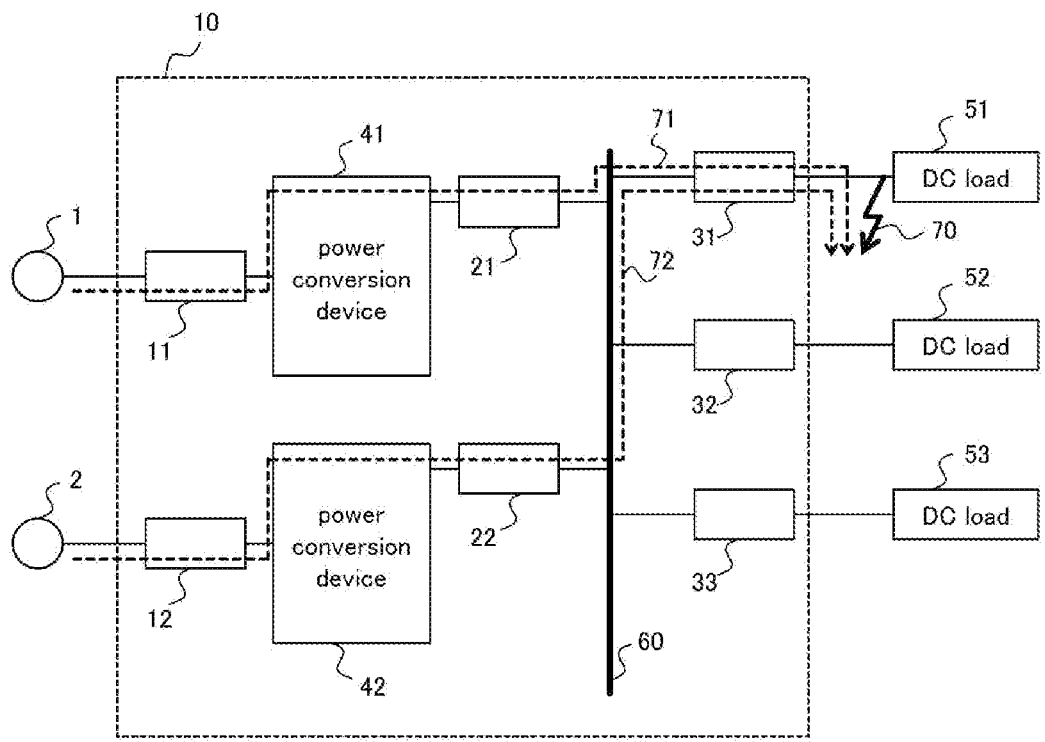
FIG. 2 illustrates a short-circuit failure in the DC power distribution system according to embodiment 1.

FIG. 2 illustrates a case where a short-circuit failure has occurred on the distribution line to which the DC load is connected in the DC power distribution system 10 of the present embodiment. In FIG. 2, a solid-line arrow indicates a part where a short-circuit failure 70 has occurred. In addition, two broken-line arrows respectively indicate short-circuit current 71 flowing from the power grid 1 to the occurrence part of the short-circuit failure 70 and short-circuit current 72 flowing from the power grid 2 to the occurrence part of the short-circuit failure.

As shown in FIG. 2, it is assumed that the short-circuit failure 70 has occurred on the distribution line to which the DC load 51 is connected, in the DC power distribution system 10. At this time, the short-circuit current 71 flowing from the power grid 1 passes through the first current interruption portion 11, the power conversion device 41, the second current interruption portion 21, the DC busbar 60, and the third current interruption portion 31, and then flows into the occurrence part of the short-circuit failure 70. Similarly, the short-circuit current 72 flowing from the power grid 2 passes through the first current interruption portion 12, the power conversion device 42, the second current interruption portion 22, the DC busbar 60, and the third current interruption portion 31, and then flows into the occurrence part of the short-circuit failure 70. Thus, the short-circuit currents 71, 72 pass through the respective power conversion devices 41, 42 and the third current interruption portion 31.

The short-circuit current 71 flows until any of the first current interruption portion 11, the second current interruption portion 21, and the third current interruption portion 31 operates. Similarly, the short-circuit current 72 flows until any of the first current interruption portion 12, the second current interruption portion 22, and the third current interruption portion 31 operates. Thus, during a period from occurrence of the short-circuit failure until interruption of the short-circuit current 71, the short-circuit current 71 flows through the power conversion device 41. Similarly, during a period from occurrence of the short-circuit failure until interruption of the short-circuit current 72, the short-circuit current 72 flows through the power conversion device 42.

The short-circuit currents 71, 72 highly depend on parasitic impedances such as a parasitic inductance and a parasitic resistance present on the current paths, and the types of the power conversion devices 41, 42. However, in a general DC power distribution system, for distributing power to DC loads efficiently, parasitic impedances of current paths which cause loss are designed to be small. Therefore, the influence of the parasitic impedances of the current paths on the short-circuit currents is almost negligible. In addition, there are various types of power conversion devices, and in a case of using such a type that includes an inductance inside the power conversion device, the magnitude of the short-circuit current is reduced. Further, the magnitude of the inductance of the power conversion device differs also by the type of the power conversion device. Therefore, the inductance value of the power conversion device 41 and the inductance value of the power conversion device 42 are different from each other. Thus, the current value of the short-circuit current 71 and the current value of the short-circuit current 72 are different from each other.

In the semiconductor elements composing the power conversion devices, there is a maximum allowable value for applied current. In general, if current exceeding the maximum allowable value for applied current flows, the semiconductor element is highly likely to fail. Hereinafter, the maximum allowable value for applied current of the power conversion device is referred to as a maximum allowable current value. Each short-circuit current 71, 72 increases with elapse of time from occurrence of the short-circuit failure until any of the first current interruption portion 11, 12, the second current interruption portion 21, 22, and the third current interruption portion 31 operates.

Here, it is assumed that the inductance inside the power conversion device 41 is greater than the inductance inside the power conversion device 42. In this case, the short-circuit current 72 flowing through the power conversion device 42 increases faster than the short-circuit current 71 flowing through the power conversion device 41. Therefore, the short-circuit current 72 flowing through the power conversion device 42 will reach the maximum allowable current value in a shorter time than the short-circuit current 71. Thus, the power conversion device 42 has a smaller withstand capacity against a short-circuit failure than the power conversion device 41.

For ensuring reliability of the DC power distribution system, the distribution line on which the short-circuit failure has occurred needs to be electrically disconnected at a smaller current value than the maximum allowable current value of the power conversion device of which the withstand capacity against a short-circuit failure is smallest among the power conversion devices included in the DC power distribution system. That is, interruption current values of the plurality of third current interruption portions 31, 32, 33 are set to smaller values than the maximum allowable current value of the power conversion device in which the short-circuit current will reach the maximum allowable current value of the power conversion device in the shortest time among the plurality of power conversion devices 41, 42.

In the DC power distribution system 10 configured as described above, even in a case where a short-circuit failure has occurred, the power conversion devices 41, 42 do not fail and only the distribution line on which the short-circuit failure has occurred is disconnected from the output path by the third current interruption portion, whereby it is possible to continue power distribution to the other normal distribution lines. In addition, the power conversion devices 41, 42 need not be provided with a current resonance circuit, and therefore increase in device cost can be suppressed.

Embodiment 2

In embodiment 1, setting for the interruption current values of the third current interruption portions has been described. In embodiment 2, setting for interruption current values of the second current interruption portions will be described. The configuration of the DC power distribution system in the present embodiment is the same as the configuration of the DC power distribution system in embodiment 1.

Figure 3:
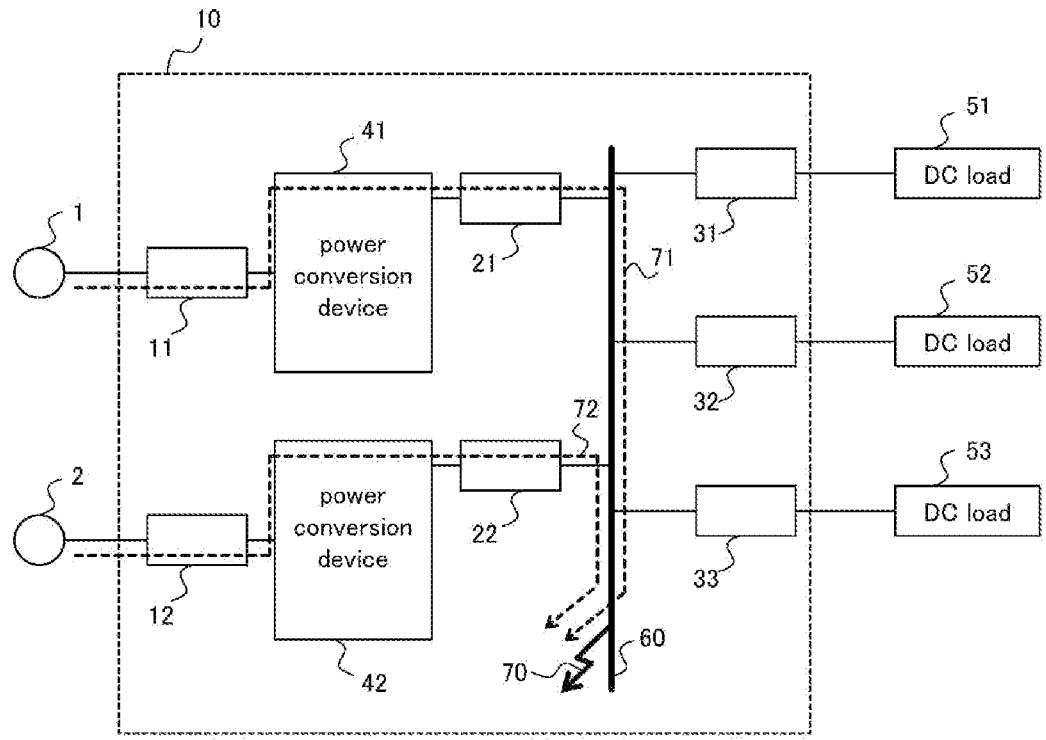
FIG. 3 illustrates a short-circuit failure in a DC power distribution system according to embodiment 2.

FIG. 3 illustrates a case where a short-circuit failure has occurred on the DC busbar 60 in the DC power distribution system 10 of the present embodiment. At this time, the short-circuit current 71 flowing from the power grid 1 passes through the first current interruption portion 11, the power conversion device 41, the second current interruption portion 21, and the DC busbar 60, and then flows into the occurrence part of the short-circuit failure 70. Similarly, the short-circuit current 72 flowing from the power grid 2 passes through the first current interruption portion 12, the power conversion device 42, the second current interruption portion 22, and the DC busbar 60, and then flows into the occurrence part of the short-circuit failure 70. Thus, the short-circuit currents 71, 72 pass through the respective power conversion devices 41, 42.

The short-circuit current 71 flows until either the first current interruption portion 11 or the second current interruption portion 21 operates. Similarly, the short-circuit current 72 flows until either the first current interruption portion 12 or the second current interruption portion 22 operates. Thus, during a period from occurrence of the short-circuit failure until interruption of the short-circuit current 71, the short-circuit current 71 flows through the power conversion device 41. Similarly, during a period from occurrence of the short-circuit failure until interruption of the short-circuit current 72, the short-circuit current 72 flows through the power conversion device 42.

Here, in order to interrupt the short-circuit currents 71, 72 by the second current interruption portions 21, 22 and protect the power conversion devices 41, 42, an interruption current value of the second current interruption portion 21 needs to be set to a smaller value than the maximum allowable current value of the power conversion device 41. Similarly, an interruption current value of the second current interruption portion 22 needs to be set to a smaller value than the maximum allowable current value of the power conversion device 42. That is, the interruption current values of the second current interruption portions 21, 22 need to be individually set in consideration of the withstand capacities of the power conversion devices 41, 42 against a short-circuit failure. However, setting different interruption current values for the plurality of second current interruption portions increases the number of types of devices composing the DC power distribution system, leading to increase in the cost for the DC power distribution system.

In the DC power distribution system 10 of the present embodiment, the withstand capacities of the power conversion devices 41, 42 against a short-circuit failure are set to be equal, whereby it becomes possible to set an equal interruption current value for the second current interruption portions 21, 22. As a result, the same devices can be used in common for the second current interruption portions 21, 22, and therefore it becomes possible to suppress increase in the cost for the DC power distribution system 10.

Examples of methods for setting the withstand capacities of the power conversion devices 41, 42 against a short-circuit failure to an equal value are as follows: increasing the internal inductance value of the power conversion device having the lower withstand capacity, of the power conversion devices 41, 42, or using semiconductor elements having a large maximum allowable current value for the semiconductor elements composing the power conversion devices 41, 42. It is noted that, when the values are "equal" in the present embodiment, the values are considered equal even if there is error due to individual differences among devices composing the power conversion devices 41, 42.

In the DC power distribution system configured as described above, the same devices can be used in common for the second current interruption portions, and therefore increase in cost can be suppressed. In addition, since the withstand capacities of the power conversion devices 41, 42 against a short-circuit failure are set to be equal, the same devices as those used for the second current interruption portions can also be used in common for the third current interruption portions, whereby increase in cost can be further suppressed.

Embodiment 3

In embodiment 3, a case where one power grid is a three-phase AC grid and another power grid is a single-phase AC grid in the DC power distribution system of embodiment 1 will be described. The configuration of the DC power distribution system in the present embodiment is the same as the configuration of the DC power distribution system in embodiment 1. The power grid 1 is assumed to be a three-phase AC grid and the power grid 2 is assumed to be a single-phase AC grid.

Figure 4:
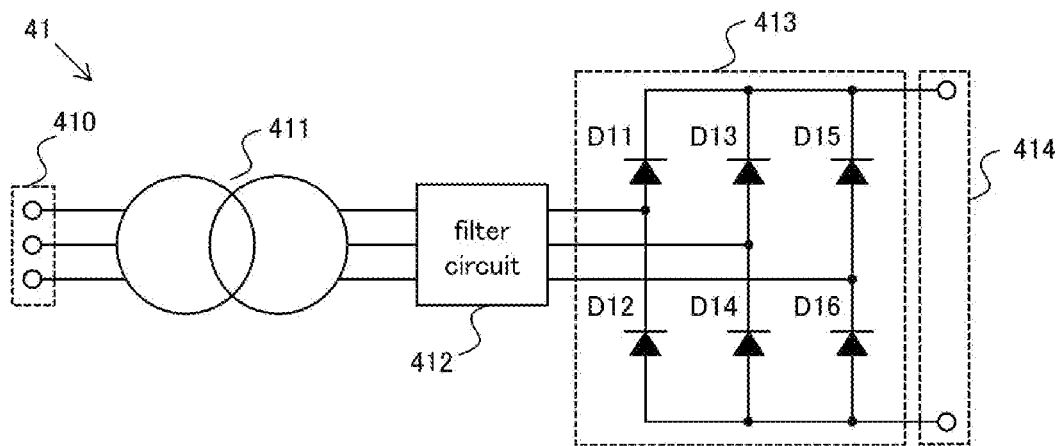
FIG. 4 is a configuration diagram of a power conversion device according to embodiment 3.

FIG. 4 is a configuration diagram of the power conversion device 41 in the DC power distribution system according to the present embodiment. The power conversion device 41 is an AC-DC power conversion device that receives three-phase AC power from the power grid 1 and converts the AC power to DC power. As shown in FIG. 4, the power conversion device 41 of the present embodiment includes an AC input terminal 410 through which three-phase AC power of the power grid 1 is inputted, a transformer 411, a filter circuit 412, a rectifier 413, and a DC output terminal 414 through which DC power is outputted.

The transformer 411 includes a primary winding and a secondary winding. The turns ratio of the primary winding and the secondary winding is determined from the relationship among DC voltage of the DC power distribution system, AC voltage of the primary winding, and AC voltage of the secondary winding. The primary winding of the transformer 411 has taps for making voltage of the secondary winding constant when voltage of the power grid 1 varies. The rectifier 413 does not have an output voltage control function. Therefore, if voltage of the power grid 1 varies and thus voltage of the secondary winding also varies, voltage of the DC power distribution system also varies. If DC voltage of the DC power distribution system varies to be outside of the operation voltage range of the DC load, the DC load cannot operate. In the power conversion device 41 of the present embodiment, since the primary winding has taps, voltage of the secondary winding is kept constant. Therefore, the output of the DC power distribution system 10 is not influenced by voltage variation in the power grid 1, and reliability of the DC power distribution system is improved.

The filter circuit 412 is connected for preventing a harmonic generated by the rectifier 413 from flowing into the power grid 1, and is connected as necessary.

The rectifier 413 includes six diodes D11 to D16 which are semiconductor elements. In general, the rectifier 413 shown in FIG. 4 is called a 6-pulse rectifier or simply called a diode rectifier. Further, for the purpose of reducing ripple of voltage outputted from the DC output terminal 414, a DC reactor or a capacitor may be connected between the rectifier 413 and the DC output terminal 414. It is possible to increase the current capacity of the power conversion device 41 by connecting a plurality of rectifiers 413 in parallel, and it is also possible to increase the current capacity by connecting a plurality of diodes D11 to D16 in parallel as necessary.

In addition, the transformer 411 has a short-circuit impedance, and when a short-circuit failure has occurred, the transformer 411 can reduce short-circuit current. Further, by setting this short-circuit impedance to an appropriate value, it is also possible to reduce the short-circuit current to the maximum allowable current value of the semiconductor element or lower.

Figure 5:
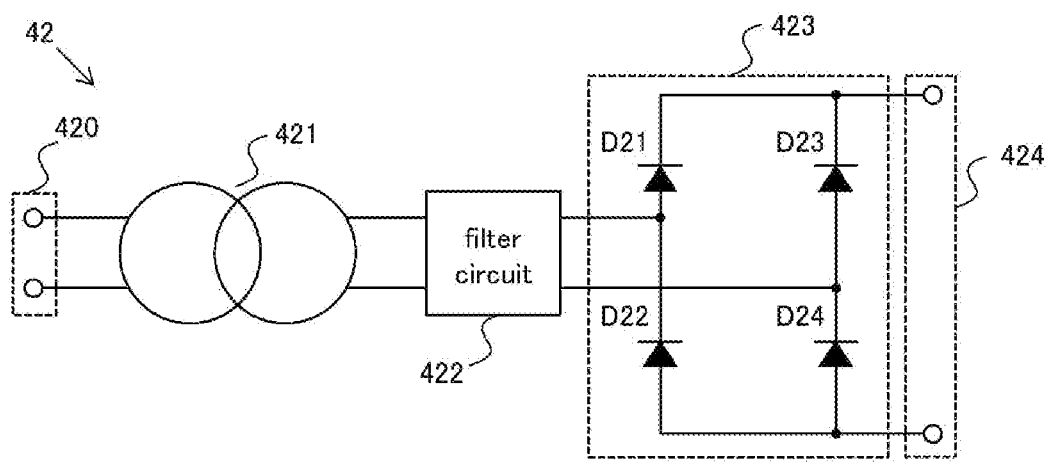
FIG. 5 is a configuration diagram of a power conversion device according to embodiment 3.

FIG. 5 is a configuration diagram of the power conversion device 42 in the DC power distribution system according to the present embodiment. The power conversion device 42 is an AC-DC power conversion device that receives single-phase AC power from the power grid 2 and converts the AC power to DC power. As shown in FIG. 5, the power conversion device 42 of the present embodiment includes an AC input terminal 420 through which single-phase AC power of the power grid 2 is inputted, a transformer 421, a filter circuit 422, a rectifier 423, and a DC output terminal 424 through which DC power is outputted.

The transformer 421 includes a primary winding and a secondary winding. The turns ratio of the primary winding and the secondary winding is determined from the relationship among DC voltage of the DC power distribution system, AC voltage of the primary winding, and AC voltage of the secondary winding. The primary winding of the transformer 421 has taps for making voltage of the secondary winding constant when voltage of the power grid 2 varies. The rectifier 423 does not have an output voltage control function. Therefore, if voltage of the power grid 2 varies and thus voltage of the secondary winding also varies, voltage of the DC power distribution system also varies. If DC voltage of the DC power distribution system varies to be outside of the operation voltage range of the DC load, the DC load cannot operate. In the power conversion device 42 of the present embodiment, since the primary winding has taps, voltage of the secondary winding is kept constant. Therefore, the output of the DC power distribution system 10 is not influenced by voltage variation in the power grid 2, and reliability of the DC power distribution system is improved.

The filter circuit 422 is connected for preventing a harmonic generated by the rectifier 423 from flowing into the power grid 2, and is connected as necessary.

The rectifier 423 includes four diodes D21 to D24 which are semiconductor elements. In general, the rectifier 423 shown in FIG. 5 is called a single-phase rectifier or simply called a diode rectifier. Further, for the purpose of reducing ripple of voltage outputted from the DC output terminal 424, a DC reactor or a capacitor may be connected between the rectifier 423 and the DC output terminal 424. It is possible to increase the current capacity of the power conversion device 42 by connecting a plurality of rectifiers 423 in parallel, and it is also possible to increase the current capacity by connecting a plurality of diodes D21 to D24 in parallel as necessary.

In addition, the transformer 421 has a short-circuit impedance, and when a short-circuit failure has occurred, the transformer 421 can reduce short-circuit current. Further, by setting this short-circuit impedance to an appropriate value, it is also possible to reduce the short-circuit current to the maximum allowable current value of the semiconductor element or lower.

In the DC power distribution system 10 configured as described above, in a case where one power grid is a three-phase AC grid and another power grid is a single-phase AC grid, it is possible to convert the respective received AC powers to DC powers and distribute the DC powers to the DC loads.

Embodiment 4

In embodiment 3, a case where the rectifier of the power conversion device 42 is a single-phase rectifier has been described. However, in general, a single-phase rectifier outputs more harmonic components than a 6-pulse rectifier. Therefore, the filter circuit 422 of the power conversion device 42 needs to be larger than the filter circuit 412 of the power conversion device 41, leading to increase in cost for the DC power distribution system. In addition, since ripple of the output voltage of a single-phase rectifier is greater than ripple of the output voltage of a 6-pulse rectifier, the capacitance of a capacitor for reducing ripple of the output voltage needs to be increased. This also leads to increase in cost for the DC power distribution system. A DC power distribution system of embodiment 4 is configured such that the rectifier of the power conversion device 42 to which single-phase AC power is inputted in the DC power distribution system of embodiment 3 is replaced with a single-phase pulse width modulation rectifier (single-phase PWM rectifier). The configuration of the DC power distribution system in the present embodiment is the same as the configuration of the DC power distribution system in embodiment 1. The power grid 1 is assumed to be a three-phase AC grid and the power grid 2 is assumed to be a single-phase AC grid.

Figure 6:
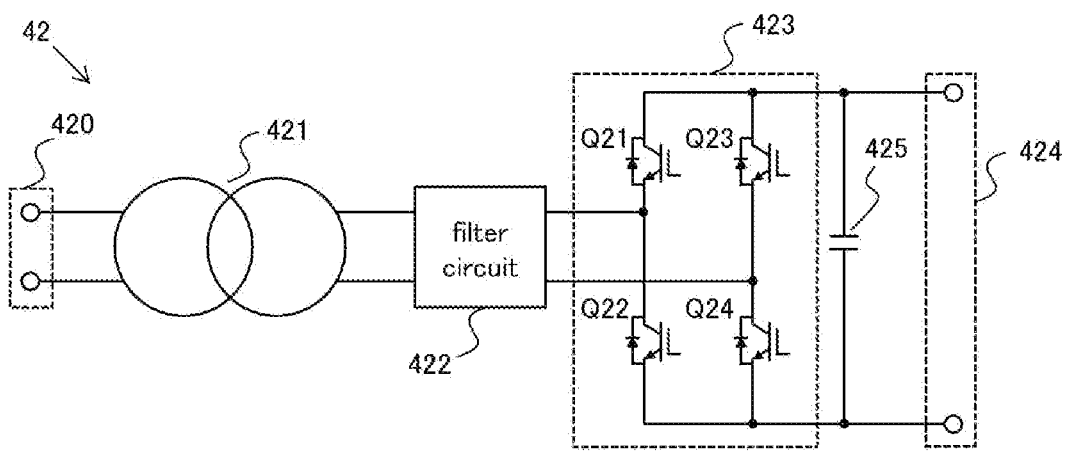
FIG. 6 is a configuration diagram of a power conversion device according to embodiment 4.

FIG. 6 is a configuration diagram of the power conversion device 42 in the DC power distribution system according to the present embodiment. The power conversion device 42 is an AC-DC power conversion device that receives single-phase AC power from the power grid 2 and converts the AC power to DC power. As shown in FIG. 6, the power conversion device 42 of the present embodiment includes an AC input terminal 420 through which single-phase AC power of the power grid 2 is inputted, a transformer 421, a filter circuit 422, a rectifier 423, and a DC output terminal 424 through which DC power is outputted. Further, in the power conversion device 42 of the present embodiment, a capacitor 425 for reducing ripple of output voltage is connected in parallel to the DC output terminal 424. The transformer 421 is the same as that of the power conversion device 42 in embodiment 3, and the filter circuit 422 is also connected in the same manner as necessary.

The rectifier 423 of the present embodiment is configured such that the four diodes D21 to D24 of the rectifier 423 of the power conversion device 42 in embodiment 3 are respectively replaced with four semiconductor switching elements Q21 to Q24. In general, the rectifier 423 shown in FIG. 6 is called a single-phase PWM rectifier. The semiconductor switching elements Q21 to Q24 may be semiconductor switching elements having a self-turn-off function, such as an insulated gate bipolar transistor (IGBT) or a metal oxide semiconductor filed effect transistor (MOSFET) to which a diode is connected in antiparallel, for example. It is also possible to increase the current capacity by connecting a plurality of the semiconductor switching elements in parallel as necessary. The semiconductor switching elements Q21 to Q24 are switched between ON and OFF by a gate drive circuit (not shown), and operations of switching between ON and OFF (switching operations) are controlled by a control signal transmitted from a control unit (not shown).

Since the rectifier 423 of the present embodiment is configured as a single-phase PWM rectifier, a harmonic component outputted through switching operations of the semiconductor switching elements Q21 to Q24 can be reduced, and therefore the filter circuit 422 can be downsized. In addition, if switching operations of the semiconductor switching elements Q21 to Q24 are performed at a higher frequency, the filter circuit 422 can be downsized. Further, since ripple of DC voltage outputted through switching operations of the semiconductor switching elements Q21 to Q24 can be reduced, the capacitor 425 can be downsized.

In a case where power quality requirements of the single-phase AC grid of the power grid 2 are severe and an allowable harmonic level is small, a single-phase PWM rectifier needs to be applied to the power conversion device 42 which receives power from the power grid 2.

In the DC power distribution system of the present embodiment, since a single-phase PWM rectifier is applied to the power conversion device which receives single-phase AC power, the filter circuit and the capacitor of this power conversion device can be downsized. As a result, the cost for the DC power distribution system can be reduced.

Embodiment 5

In embodiment 4, a method for reducing a harmonic component in a power conversion device connected to a single-phase AC grid has been described. In embodiment 5, a method for reducing a harmonic component in a power conversion device connected to a three-phase AC grid will be described.

Figure 7:
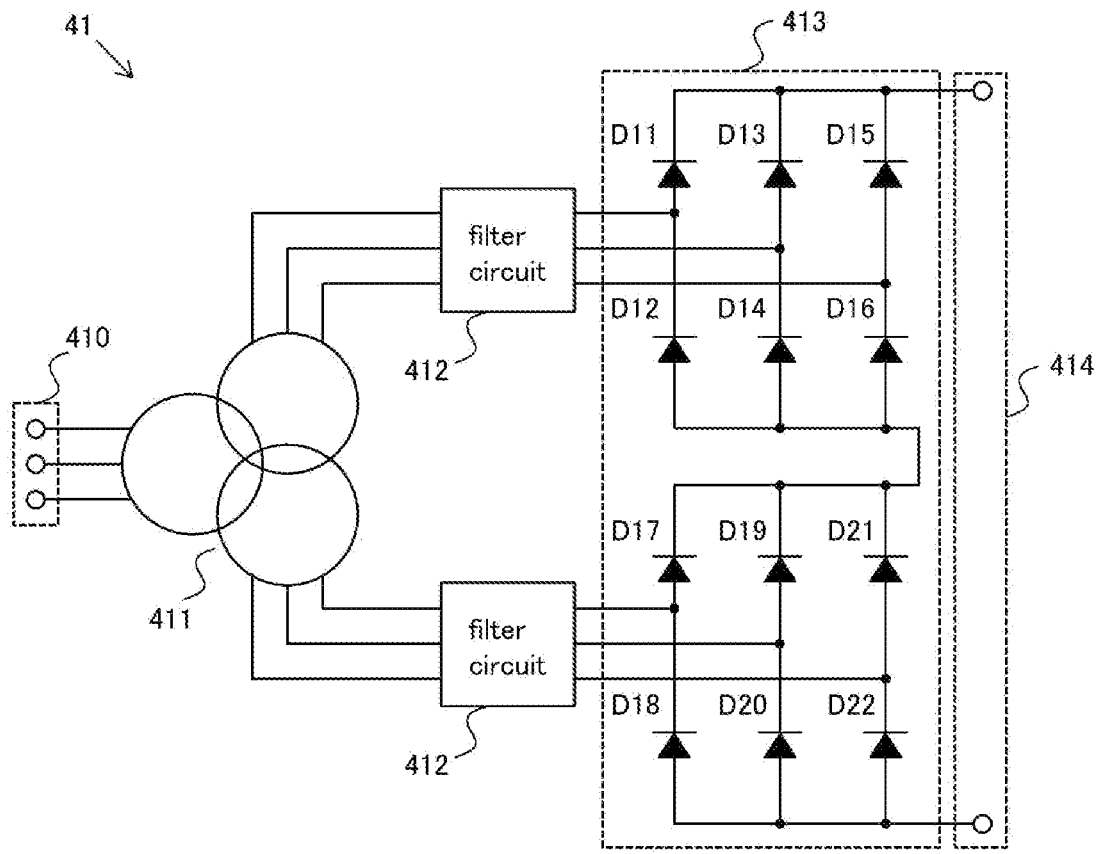
FIG. 7 is a configuration diagram of a power conversion device according to embodiment 5.

FIG. 7 is a configuration diagram of the power conversion device 41 in the DC power distribution system according to the present embodiment. The power conversion device 41 is an AC-DC power conversion device that receives three-phase AC power from the power grid 1 and converts the AC power to DC power. As shown in FIG. 7, the power conversion device 41 of the present embodiment includes an AC input terminal 410 through which three-phase AC power of the power grid 1 is inputted, a transformer 411, a filter circuit 412, a rectifier 413, and a DC output terminal 414 through which DC power is outputted. The configuration of the DC power distribution system in the present embodiment is the same as the configuration of the DC power distribution system in embodiment 1.

The transformer 411 includes a primary winding, a secondary winding, and a tertiary winding. The transformer 411 performs voltage conversion of three-phase AC power inputted to the primary winding, to each of the secondary winding and the tertiary winding, and outputs resultant powers.

The filter circuit 412 is connected for preventing a harmonic generated by the rectifier 413 from flowing into the power grid 1, and is connected as necessary.

The rectifier 413 includes twelve diodes D11 to D22 which are semiconductor elements. In general, the rectifier 413 shown in FIG. 7 is called a 12-pulse rectifier or simply called a diode rectifier. The rectifier 413 is configured such that the 6-pulse rectifiers shown in FIG. 4 are connected in series. As shown in FIG. 7, the outputs of the secondary winding and the tertiary winding of the transformer 411 are respectively inputted to two 6-pulse rectifiers connected in series.

A harmonic outputted from the 12-pulse rectifier is smaller than that of the 6-pulse rectifier. Therefore, in the DC power distribution system of the present embodiment, a harmonic is smaller than in the DC power distribution system of embodiment 3. Thus, in the DC power distribution system of the present embodiment, the filter circuit 412 can be downsized or can be removed. In a case where power quality requirements of the three-phase AC grid of the power grid 1 are severe and an allowable harmonic level is small, a 12-pulse rectifier needs to be applied to the power conversion device 41 which receives power from the power grid 1.

Further, in the DC power distribution system of the present embodiment, short-circuit current when a short-circuit failure has occurred is reduced owing to a drooping characteristic based on magnetic coupling between the secondary winding and the tertiary winding of the transformer 411. Thus, the withstand capacity against a short-circuit failure can be improved. It is possible to increase the current capacity of the power conversion device 41 by connecting a plurality of rectifiers 413 in parallel, and it is also possible to increase the current capacity by connecting a plurality of diodes D11 to D22 in parallel as necessary.

Embodiment 6

Figure 8:
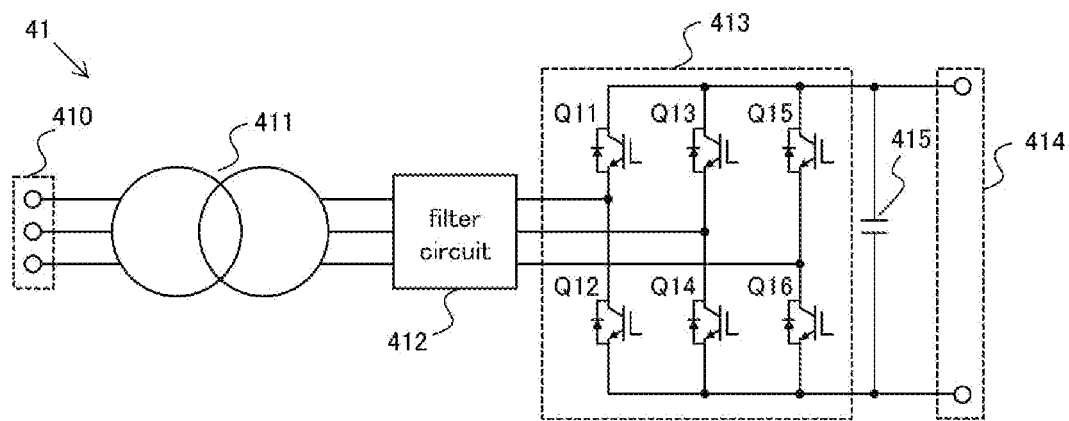
FIG. 8 is a configuration diagram of a power conversion device according to embodiment 6.

FIG. 8 is a configuration diagram of the power conversion device 41 in the DC power distribution system according to embodiment 6. The power conversion device 41 is an AC-DC power conversion device that receives three-phase AC power from the power grid 1 and converts the AC power to DC power. As shown in FIG. 8, the power conversion device 41 of the present embodiment includes an AC input terminal 410 through which three-phase AC power of the power grid 1 is inputted, a transformer 411, a filter circuit 412, a rectifier 413, and a DC output terminal 414 through which DC power is outputted. Further, in the power conversion device 41 of the present embodiment, a capacitor 415 for reducing ripple of output voltage is connected in parallel to the DC output terminal 414. The transformer 411 and the filter circuit 412 are the same as those of the power conversion device 41 in embodiment 3. The configuration of the DC power distribution system in the present embodiment is the same as the configuration of the DC power distribution system in embodiment 1.

The rectifier 413 of the present embodiment is configured such that the six diodes D11 to D16 of the rectifier 413 of the power conversion device 41 in embodiment 3 are replaced with six semiconductor switching elements Q11 to Q16. In general, the rectifier 413 shown in FIG. 8 is called a three-phase PWM rectifier. The semiconductor switching elements Q11 to Q16 may be semiconductor switching elements having a self-turn-off function, such as an IGBT or a MOSFET to which a diode is connected in antiparallel, for example. It is also possible to increase the current capacity by connecting a plurality of the semiconductor switching elements in parallel as necessary. Switching operations of the semiconductor switching elements Q11 to Q16 are controlled by a control signal transmitted from a control unit (not shown).

Since the rectifier 413 of the present embodiment is configured as a three-phase PWM rectifier, a harmonic component outputted through switching operations of the semiconductor switching elements Q11 to Q16 can be reduced, and therefore the filter circuit 412 can be downsized. In addition, if switching operations of the semiconductor switching elements Q11 to Q16 are performed at a higher frequency, the filter circuit 412 can be downsized. Further, since ripple of DC voltage outputted through switching operations of the semiconductor switching elements Q11 to Q16 can be reduced, the capacitor 415 can be downsized.

In a case where power quality requirements of the three-phase AC grid of the power grid 1 are severe and an allowable harmonic level is small, a three-phase PWM rectifier needs to be applied to the power conversion device 41 which receives power from the power grid 1.

In the DC power distribution system of the present embodiment, since a three-phase PWM rectifier is applied to the power conversion device which receives three-phase AC power, the filter circuit and the capacitor of the power conversion device can be downsized. As a result, the cost for the DC power distribution system can be reduced. It is possible to increase the current capacity of the power conversion device 41 by connecting a plurality of rectifiers 413 in parallel.

Embodiment 7

In the DC power distribution system according to each of embodiments 3 to 6, the AC-DC power conversion device has been described. In a DC power distribution system of embodiment 7, a DC-DC power conversion device will be described. The configuration of the DC power distribution system in the present embodiment is the same as the configuration of the DC power distribution system in embodiment 1.

Figure 9:
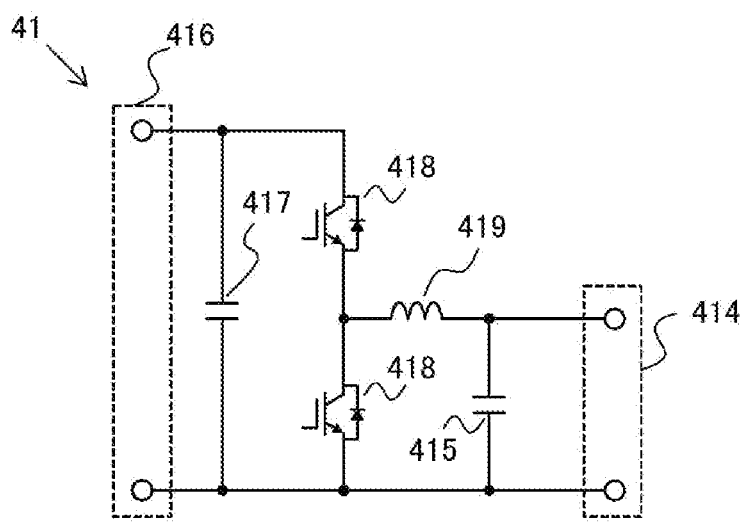
FIG. 9 is a configuration diagram of a power conversion device according to embodiment 7.

FIG. 9 is a configuration diagram of the power conversion device 41 in the DC power distribution system according to the present embodiment. The power conversion device 41 is a DC-DC power conversion device that receives DC power from the power grid 1 and converts the DC power to DC power having different voltage. As shown in FIG. 9, the power conversion device 41 of the present embodiment includes a DC input terminal 416 through which DC power of the power grid 1 is inputted, a capacitor 417 connected in parallel to the DC input terminal 416, two semiconductor switching elements 418 connected in parallel to the capacitor 417, and a DC output terminal 414 through which DC power is outputted. Further, the power conversion device 41 includes a DC reactor 419 connected between the DC output terminal and an intermediate point between the two semiconductor switching elements 418, and a capacitor 415 connected in parallel to the DC output terminal 414. The power conversion device 41 shown in FIG. 9 is called a bidirectional chopper, and is a power conversion device capable of transmitting power in both directions between the DC input terminal 416 and the DC output terminal 414.

Switching operations of the two semiconductor switching elements 418 are controlled by a control signal transmitted from a control unit (not shown). In the power conversion device 41 of the present embodiment, voltage of DC power outputted from the DC output terminal 414 can be controlled to be constant with high accuracy through control of switching operations of the semiconductor switching elements 418. Thus, the power quality of the DC power distribution system 10 can be improved. In addition, in a case where a short-circuit failure has occurred, short-circuit current is reduced by the DC reactor 419. Therefore, by appropriately setting the reactance value of the DC reactor 419, it is possible to improve the withstand capacity of the power conversion device 41 against short-circuit. It is possible to increase the current capacity of the power conversion device 41 by connecting, in parallel, a plurality of series-connection units each composed of two semiconductor switching elements 418.

Figure 10:
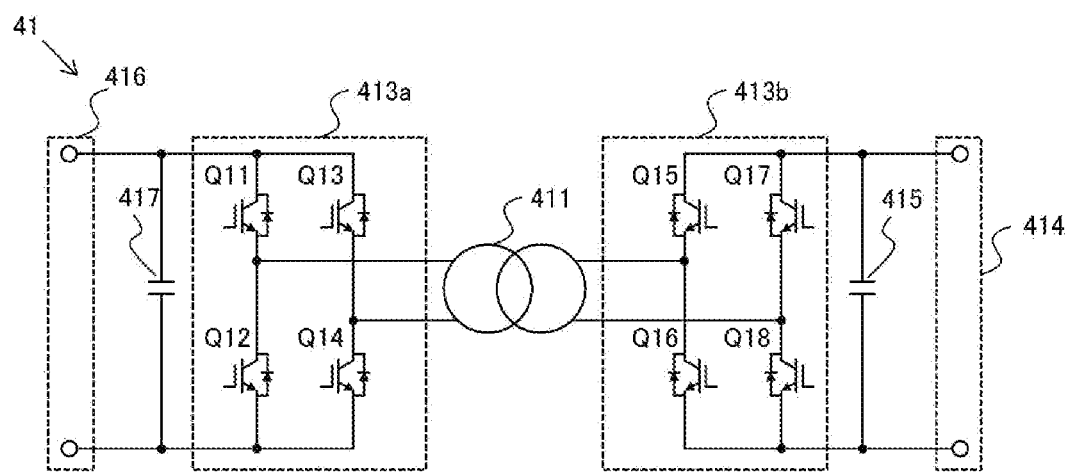
FIG. 10 is a configuration diagram of a power conversion device according to embodiment 7.

FIG. 10 is a configuration diagram of another power conversion device 41 in the DC power distribution system according to the present embodiment. The power conversion device 41 is a DC-DC power conversion device that receives DC power from the power grid 1 and converts the DC power to DC power having different voltage.

As shown in FIG. 10, the power conversion device 41 of the present embodiment includes a DC input terminal 416 through which DC power of the power grid 1 is inputted, a capacitor 417 connected in parallel to the DC input terminal 416, a primary-side bridge circuit 413a composed of four semiconductor switching elements Q11 to Q14, a transformer 411, a secondary-side bridge circuit 413b composed of four semiconductor switching elements Q15 to Q18, a DC output terminal 414 through which DC power is outputted, and a capacitor 415 connected in parallel to the DC output terminal 414. The power conversion device 41 shown in FIG. 10 is called a bidirectional isolation DC-DC power conversion device, and is a power conversion device capable of transmitting power in both directions between the DC input terminal 416 and the DC output terminal 414.

Switching operations of the semiconductor switching elements Q11 to Q14 of the primary-side bridge circuit 413*a* and switching operations of the semiconductor switching elements Q15 to Q18 of the secondary-side bridge circuit 413*b* are controlled by a control signal transmitted from a control unit (not shown). In the power conversion device 41 of the present embodiment, voltage of DC power outputted from the DC output terminal 414 can be controlled to be constant with high accuracy through control of switching operations of the semiconductor switching elements Q11 to Q18. Thus, the power quality of the DC power distribution system 10 can be improved. In addition, if switching operations of the semiconductor switching elements Q11 to Q18 are performed at a higher frequency, the transformer 411 can be downsized. Further, the transformer 411 has a short-circuit impedance, and when a short-circuit failure has occurred, the transformer 411 can reduce short-circuit current. Further, by setting this short-circuit impedance to an appropriate value, it is also possible to reduce the short-circuit current to the maximum allowable current value of the semiconductor element or lower. It is possible to increase the current capacity of the power conversion device 41 by connecting a plurality of primary-side bridge circuits 413*a* in parallel and connecting a plurality of secondary-side bridge circuits 413*b* in parallel, and it is also possible to increase the current capacity by connecting a plurality of semiconductor switching elements Q11 to Q18 in parallel as necessary.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1, 2 power grid
10 DC power distribution system
11, 12 first current interruption portion
21, 22 second current interruption portion
31, 32, 33 third current interruption portion
41, 42 power conversion device
51, 52, 53 DC load
60 DC busbar
70 short-circuit failure
71, 72 short-circuit current
410, 420 AC input terminal
411, 421 transformer
412, 422 filter circuit
413, 423 rectifier
414, 424 DC output terminal
417, 415, 425 capacitor
413*a* primary-side bridge circuit
413*b* secondary-side bridge circuit
416 DC input terminal
418 semiconductor switching element
419 DC reactor

The invention claimed is:

1. A DC power distribution system comprising:
a plurality of power conversion devices which convert powers respectively supplied from a plurality of power grids to DC powers and output the DC powers;
one DC busbar through which the DC powers outputted from the plurality of power conversion devices flow;
a plurality of distribution lines branched from the DC busbar;
a plurality of first current interruption portions respectively connected between the plurality of power grids and the plurality of power conversion devices;
a plurality of second current interruption portions respectively connected between the plurality of power conversion devices and the DC busbar; and
a plurality of third current interruption portions respectively provided on the plurality of distribution lines, wherein
interruption current values of the plurality of third current interruption portions are set to smaller values than a maximum allowable current value of the power conversion device in which short-circuit current will reach the maximum allowable current value of the power conversion device in a shortest time among the plurality of power conversion devices.

2. The DC power distribution system according to claim 1, wherein
an interruption current value of each second current interruption portion is smaller than the maximum allowable current value of the power conversion device to which the second current interruption portion is connected.

3. The DC power distribution system according to claim 1, wherein
the maximum allowable current values of the plurality of power conversion devices are equal.

4. The DC power distribution system according to claim 1, wherein
a harmonic outputted from each of the plurality of power conversion devices is within a harmonic allowable range prescribed for the power grid that supplies the power to the power conversion device.

5. The DC power distribution system according to claim 1, wherein
at least one of the plurality of power conversion devices is an AC-DC power conversion device including an AC input terminal, a transformer of which an input side is connected to the AC input terminal, a filter circuit connected to an output side of the transformer, a diode rectifier of which an input side is connected to the filter circuit, and a DC output terminal connected to an output side of the diode rectifier.

6. The DC power distribution system according to claim 1, wherein
at least one of the plurality of power conversion devices is an AC-DC power conversion device including an AC input terminal, a transformer of which an input side is connected to the AC input terminal, a filter circuit connected to an output side of the transformer, a PWM rectifier of which an input side is connected to the filter circuit, and a DC output terminal connected to an output side of the PWM rectifier.

7. The DC power distribution system according to claim 1, wherein
at least one of the plurality of power conversion devices is a DC-DC power conversion device including a DC input terminal, a first capacitor connected in parallel to the DC input terminal, two semiconductor switching elements connected in parallel to the first capacitor, a DC output terminal connected to an intermediate point between the two semiconductor switching elements, a DC reactor connected between the DC output terminal and the intermediate point between the two semiconductor switching elements, and a second capacitor connected in parallel to the DC output terminal.

8. The DC power distribution system according to claim 1, wherein
at least one of the plurality of power conversion devices is a DC-DC power conversion device including a DC input terminal, a first capacitor connected in parallel to the DC input terminal, a primary-side bridge circuit connected in parallel to the first capacitor, a DC output terminal, a second capacitor connected in parallel to the DC output terminal, a secondary-side bridge circuit connected in parallel to the second capacitor, and a transformer connected between the primary-side bridge circuit and the secondary-side bridge circuit.

* * * * *